United States Patent [19]
Walaschek

[11] 3,835,117
[45] Sept. 10, 1974

[54] RUBBERIZED COAL TAR PITCH EMULSION

[75] Inventor: John P. Walaschek, Fort Lauderdale, Fla.

[73] Assignee: Walaschek and Associates, Incorporated, Fort Lauderdale, Fla.

[22] Filed: Mar. 5, 1973

[21] Appl. No.: 337,930

[52] U.S. Cl. .................... 260/28.5 AS, 260/28.5 A
[51] Int. Cl. ............................................ C08f 45/52
[58] Field of Search ................. 260/28.5 B, 28.5 AS

[56] References Cited
UNITED STATES PATENTS

| | | | |
|---|---|---|---|
| 2,509,777 | 5/1950 | McMillan | 260/894 |
| 2,537,190 | 1/1951 | Lankau | 260/28.5 B |
| 3,027,342 | 3/1962 | Kemp | 260/28.5 B |
| 3,296,165 | 1/1967 | Kemp | 260/28.5 B |
| 3,372,083 | 3/1968 | Evans | 260/37 N |
| 3,493,408 | 2/1970 | Drukker | 260/28.5 B |
| 3,497,371 | 2/1970 | Chang | 260/28.5 B |

Primary Examiner—Morris Liebman
Assistant Examiner—P. R. Michl
Attorney, Agent, or Firm—Webb, Burden, Robinson & Webb

[57] ABSTRACT

Improved rubberized coal tar emulsion compositions especially suitable for sealing bituminous pavement compositions, such as asphalt pavement compositions. A composition according to the invention comprises a major portion of a prepared coal tar pitch emulsion and water, having admixed therewith a small amount of an acrylonitrile/butadiene copolymer latex having an extraordinarily small particle size. Preferred compositions additionally include a silicone resin. The compositions further include an appropriate aggregate filler material such as sand. Compositions according to the invention are characterized by a thixotropic nature and the ability to maintain an aggregate in matrix like suspension. A film cast from such compositions applied as a sealing coat to an asphalt pavement is characterized by long life, uniform filler distribution, and excellent bonding characteristics.

4 Claims, No Drawings

RUBBERIZED COAL TAR PITCH EMULSION

BACKGROUND OF THE INVENTION

A. Field of the Invention

This invention relates to coal tar emulsion compositions, and more particularly to rubberize coal tar emulsion compositions especially useful as sealing coats for asphalt pavement compositions.

B. Description of the Prior Art

Aqueous tar emulsions are well known in the art of protective coatings. In its most common form an aqueous tar emulsion comprises an emulsion of a coal tar in an aqueous medium with an emulsifying, or dispersing, agent such as an organic soap or detergent and/or an inorganic colloid such as a particulate clay like bentonite. In most instances the materials are passed through a colloid mill to reduce the size of the tar particles in the discontinuous, or emulsified, phase to produce tar particles having an average particle size of from about 3–10 microns. When an ordinary emulsified coal tar coating dries upon a substance to be protected, the dried film has certain disadvantages. For example, various solvents, such as jet fuel, gasoline, and the like have readily attacked the film. In addition, the film is quite soft and its ductility and tensile strength have not been satisfactory under extreme atmospheric conditions. It has been proposed, especially where the coal tar emulsion was to be applied as a sealer for bituminous pavements, such as asphalt pavement, to incorporate various pigments into the emulsions to improve solvent resistance and film strength. Difficulties with such applications have been encountered, however, since the incorporation of various active "pigments" has required a very carefully controlled pH valve, temperature, etc., because of the tendency of pigments to coagulate the coal tar emulsion and thereby destroy it.

It has also been found that solvent resistance and elasticity of a coal tar film cast from a coal tar emulsion might be improved by the incorporation of a synthetic acrylonitirile/butadiene latex into the emulsion. Such "rubberized" coa tar emulsions have in most instances been unsatisfactory apparently for the reason that the ultimate composition comprised an emulsion of two different types of particles, viz., coal tar and polymer, and as the composition dried a loose junction between latex and coal tar resulted with was readily broken down upon ordinary weather conditions, temperature, light, and other chemical and physical film-attacking agents. Moreover, in some instances, the resultant protective coating had a tendency to re-emulsify when it was subjected to detergent and water.

U.S. Pat. No. 3,027,342 discloses a rubberized coal tar emulsion which avoids the use of an emulsifying agent. There, a dry copolymer of acrylonitrile and butadiene is incorporated into a coal tar composition and is emulsified in an aqueous medium without the addition of an emulsifying agent by vigorous mechanical mixing in a colloid mill or the like. U.S. Pat. No. 3,296,165 discloses a coal tar emulsion composition comprising an emulsion coating including an emulsified coal tar/clay mixture and a butyl rubber latex. That composition further includes an aluminum powder additive and is especially suited for roofing applications. U.S. Pat. No. 3,497,371 discloses a coal tar emulsion including certain filler materials and a synthetic rubber latex. There, the emulsion composition further includes certain water-insoluble organic amines for the purpose of imparting superior water resistances to films cast of those coal tar emulsions.

This invention provides improved rubberized coal tar emulsion compositions especially suitable for use as a sealer for asphalt pavement and the like. The invention further provides a coal tar emulsion of the type described which may readily be admixed for field applications, and which has a satisfactory storage life when used within about a week. Additionally, the invention provides coal tar emulsion compositions having superior bonding qualities when compared to similar known compositions, and which may be applied to a substrate in a rapid and economical fashion. Moreover, the invention provides novel thixotropic coal tar emulsion compositions which retain their thixotropic nature when cast in an overlay film and have the ability to maintain a heavy load of aggregate filler material, such as sand, in matrix-like suspension even when applied in relatively thick films to an asphalt substrate. In addition, the invention provides a sealer coat for asphalt pavement which is characterized by a long life, excellent resistance to solvents and weather, and ease in application. Additional advantages of the invention will become apparent as this specification proceeds.

SUMMARY OF THE INVENTION

This invention provides improved rubberized coal tar emulsion compositions especiallly suitable for sealing asphalt compositions comprising a major portion of a prepared coal tar pitch emulsion and water, a minor portion of an acrylonitrile/butadiene copolymer latex having an average particle size between 400 and 1,000 angstroms, and most preferably, a silicone resin. A preferred prepared coal tar pitch emulsion comprises approximately 33 percent coal tar, 22 percent mineral clay, with the balance comprising water an appropriate wetting agents. Preferred acrylonitrile/butadiene copolymer latex compositions have a solids content comprising a medium-to-high acrylonitrile-content acrylonitrile/butadiene copolymer; e.g., a copolymer containing from about 30–40 parts acrylonitrile and 70–51 parts butadiene, having an especially small particle size when compared with ordinary acrylonitrile/-butadiene latices. The most preferred particle size for the copolymer comprises an average of about 500 angstroms or about 0.05 microns.

Preferred silicone resin compositions comprise known organopolysiloxanes such as those prepared by the co-hydrolysis of dimethyldichlorosilane and methyltricholorosilane, in proportions such that the resinous product comprises a methylpolysiloxane, or silicone, resin. Most preferred of the silicone resins comprise certain methylmethoxypolysiloxanes.

In addition to the foregoing, compositions according to the invention further include appropriate aggregate fillers such as sand. It is most preferred, in the case where sand is employed, to provide a relatively coarse sand such as that sand blasting grade sand designated No. 3 Q-ROCK, by Pennsylvania Glass Sand Co. of Pittsburgh, Pa. The preferred coarse sand aggregate filler materials most preferably are those whose particle size is such that all parts pass through a U.S. Standard No. 20 square mesh screen and substantially no parts, e.g., less than about five percent, pass through a U.S. Standard No. 30 square mesh screen.

A film including the foregoing components in appropriate proportions as will be described more fully here-after, when applied as a sealing coat to asphalt pavement is characterized by long life, excellent wear characteristics, excellent traction characteristics (even when wet), uniform aggregate filler distribution, and excellent bonding characteristics. Other advantages and details of the invention will become apparent as the following more detailed description thereof proceeds.

DESCRIPTION OF THE PREFERRED EMBODIMENTS

The coal tar employed in the prepared coal tar emulsion component of the invention may be a tar of the type conventionally designated as RT-6 to RT-12 coal tars. Such tars have an overall float test ranging from 20 seconds to 220 seconds. By float test is intended the float test designaed 139–27 ASTM standard 1942 T 480 which is commonly used for testing the viscosity of semi-solid bituminous material. Most preferred are those in the higher viscosity range such as RT 11 and RT 12 coal tars. The tar alone may be emulsified for providing a prepared coal tar emulsion, however, it is desirous that the tar be emulsified within the presence of a pigment. The pigment may be any of the common mineral pigments, such as ball clay, china clay, soap stone, browned lime stone, and the like. A preferred proportion of pigment with respect to coal tar in the initially prepared coal tar emulsion comprises about three (3) parts tar to two (2) parts pigment in an aqueous emulsified system including about 5 parts water. In preparing the emulsion, tar, pigment, water and wetting agents are generally changed to a blender for slurrying purposes and then to a colloid mill where the tar particles in emulsion are reduced to particle size of about 3–10 microns.

The prepared coal tar emulsion may include certain other materials in addition to the foregoing. For example, the prepared emulsion may include a small quantity; i.e., from about 1–5 percent by weight based upon tar, ordinary acrylonitrile/butadiene copolymer such as the rubberized coal tar emulsions described in U.S. Pat. No 3,027,342, discussed hereinabove. In substantially every case, the prepared emulsions are commercially available, and as examples of those found suitable for use in connection with the invention are the known coal tar pitch emulsions sold under the trade names "Super Pavement Sealer" by Koppers Co. of Pittsburgh, Pa. and "Jennite-J-16" pavement sealer sold by Maintenance, Inc. of Wooster, Ohio "X-10" pavement sealer sold by City Asphalt and Paving Co. of Youngstown, Ohio and "Jetcoat" 707 pavement sealer sold by Jetcoat Corp. of Columbus, Ohio.

In each of the foregoing cases, the prepared coal tar emulsion comprises generally an emulsified high viscosity coal tar, mineral filler, water and usually dispersing agents. The "Super Pavement Sealer" coal tar emulsion additionally includes about 3 percent by weight, based upon tar, of an ordinary acrylonitrile/butadiene copolymer, having been blended in crumb form into the coal tar, ordinarily prior to emulsification in water. Additionally, in the case of "Super Pavement Sealer" no dispersing agent or emulsifying agent is present.

In preparing a pavement sealing composition according to the invention, the foregoing prepared coal tar pitch emulsion is charged with at least about an equal part by volume of water to a conventional blending tank, such as an agitated horizontal cylindrical mixing tank equipped with an agitator extending lengthwise of its horizontal axis. A suitable agitator comprises a "four-paddle" blade having blades similar to those in a blade-type grass or lawn mower.

To the agitated mixture of water and coal tar emulsion is then added an appropriate aggregate filler material in an amount preferably equal to about 12 to 18, optimally 16 pounds of filler per gallon of emulsion charged to the blender. One feature of compositions of the invention is the ability to accommodate a high amount of aggregate filler material, e.g., about 10-20 pounds of filler per gallon of emulsion, for adding strength and durability to film coatings prepared therefrom without undesirable "floating out" of the filler material from the film. It is preferred that the aggregate filler material comprise a coarse sand such as the coarse sand blasting grade sand designated No. 3 Q-ROCK and described hereinabove. For accommodating the higher filler loads it is essential that the amount of "fines" be kept to a minimum. Most suitable are those fillers whose particle size is such that substantially no particles, e.g., five percent or less, pass through a Standard No. 30 mesh screen. Thereafter, upon thorough mixing of aggregate filler, coal tar pitch emulsion and water, an acrylonitrile/butadiene copolymer latex according to the invention is charged to the mixture.

Acrylonitrile/butadiene latices useful in compositions of the invention differ from conventional acrylonitrile/butadiene latices. Ordinary acrylonitrile/butadiene latices have an average particle size of about 0.25 microns. Acrylonitrile/butadiene latices useful in the invention have an extraordinarily small particle size, particularly an average latex particle size between 400 and 1,000 angstroms. Suitable acrylonitrile/butadiene latices found to be useful in the invention include those manufactured by the Chemical Division, Goodyear Tire and Rubber Co. Inc. of Akron, Ohio and sold under the trade designations "Chemigum Latex 236," "Chemigum Latex 246" and "Chemigum Latex 614." Chemigum Latex 236 is an acrylonitrile/butadiene copolymer latex which has a high acrylonitrile content, and Chemigum Latex 246 has a medium acrylonitrile content. Of the two foregoing latices, the most preferred is Chemigum Latex 246 having a medium acrylonitrile content. By medium acrylonitrile content is intended generally about a 33/67 acrylonitrile/butadiene monomer ratio in the copolymer and by high acrilonitrile content is intended generally a 45/55 acrylonitrile/butadiene monomer ratio. In general a suitable copolymer latex contains about 30-49 parts acrylonitrile and from about 70-51 parts butadiene. Most preferably, the copolymer comprises about 30-35 parts acrylonitrile and 70-65 parts butadiene.

Regarding particle size for the copolymer latex, it is preferred that the average copolymer latex particle size range from about 400-1000 angstroms. It is most preferred that the average particle size be from about 500-600 angstroms. Regarding proportions, it has been found that an amount of copolymer latex as described hereinabove many be beneficially employed in compositions of the invention in proportions from about 2.5 to 15.0 percent, preferably 8 to 12 percent, most preferably about 10 percent, by weight based upon tar content of emulsion and rubber content of latex.

Though the exact mechanism by which compositions of the invention function is not known, it has been noted that where acrylonitrile/butadiene latices of the type described are employed, i.e., having an extraordinarily small particle size of from about 500-1,000 angstroms, particularly about 500-600 angstroms, the ability of a coal tar pitch emulsion to maintain a high quantity of aggregate filler in matrix-like suspension is remarkably improved. That is true even where a higher than ordinary amount of water is employed in pavement sealing compositions. It is believed that the extraordinarily small particle size permits a more efficient distribution of the latex particles throughout a pavement sealing composition to a nearly continuous rubber phase which may then result in imparting a thixotropic nature to a pavement sealing composition. The thixotropicity is long-lasting, and renders pavement sealing compositions according to the invention reasonably storage stable. It has been noted that sand and other aggregate filler materials in compositions according to the invention do not float out of the solution when applied for example to an asphalt pavement, even where present in extraordinarily high amounts. Nor does the aggregate filler fall to the bottom of a blending tank for a pavement sealer after initial thorough mixing of components, even where the tank is allowed to stand for a considerable period of time. Thus, mixing equipment of a simplified nature may be employed with compositions according to the invention. It has also been found that pavement sealing compositions including the acrylonitrile/butadiene copolymer latices according to the invention may be applied in films up to several times thicker, usually 2-10 times thicker, than would ordinarily be expected from a conventional asphalt pavement sealer while at the same time maintaining a high proportion of aggregate filler in matrix-like, yet well dispersed, suspension. Moreover, pavement sealing films according to the invention are characterized by significantly longer life than known pavement sealing compositions. In all cases it has been noted that much-improved pavement sealing compositions may be obtained by mixing a conventional prepared coal tar pitch emulsion sealing compositions with an acrylonitrile/butadiene copolymer latex according to the invention. Such mixtures are characterized by thixotropicity and the ability to accommodate a high proportion of aggregate filler without resulting in an unmixable or unhandleable mass.

Most preferred compositions according to the invention include, in addition to the foregoing components, a silicone resin. Most preferred silicone resin compositions comprise known organopolysiloxanes such as those prepared by the co-hydrolysis of dimethyldicholorosilane and methyltricholorosilane, in proportions such that resinous product comprises a methylpolysiloxane, or "silicone" resin. Most preferred silicone resins comprise methoxymethylpolysiloxanes. Suitable silicone resin compositions are manufactured by General Electric Co. and sold under the trade designations "Dri-Film 104" silicone resin, and "Dri-Film 103" silicone resin. Of those the preferred is "Dri-Film 103" silicone resin. The description and preparation of those resins is generally found in U.S. Pat. No. 2,810,704, assigned to General Electric Co. Their certain moisture-unstable methoxypolysiloxanes are disclosed having the formula:

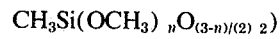

where $n$ has a value equal to from 1/3 to 0.7, as are methods for preparing the same.

The invention will be further understood by reference to the following specific examples thereof.

EXAMPLE I

To a horizontal tank equipped with an axial mechanical agitator with four mixing blades was charged 100 gallons of water and 100 gallons of the commercially available coal tar emulsion known as "X-10 Pavement Sealer" manufactured by the City Asphalt and Pavement Co. of Youngstown, Ohio. Thereafter, 1,000 pounds of coarse sand aggregate designated No. 3 Q-ROCK Sand and sold by Pennsylvania Glass Sand Co. of Pittsburgh, Pennsylvania was added to the continuously stirred water and coal tar pitch emulsion. Thereafter, 10 gallons of the small particle size latex known as "Chemigum Latex No. 246" was charged to the blender. That latex is manufactured by Goodyear Tire and Rubber Co. of Akron, Ohio and comprises an acrylonitrile/butadiene copolymer latex having a 33/67 monomer ratio, a solids content of 3.3 pounds per gallon, and an average latex particle size of 500 angstroms. Agitation was continued until the mixture was thoroughly blended. Upon discontinuing agitation it was noted that the mixture in the tank had acquired a thixotropic nature and that the aggregate filler was maintained in a matrix-like suspension without falling to the bottom of the tank.

An overlay film of the composition cast upon an asphalt pavement in conventional fashion was such that aggregate filler was maintained in substantially uniform matrix-like suspension with no undesirable "floating-out" or "falling out" of the film. Upon drying the cast film had excellent wear and weather resistance characteristics and afforded excellent traction, even when wet.

In a comparable composition prepared without the addition of Chemigum Latex 246, it was noted that much of the sand fell out of a film cast from the composition, thereby detracting from the value of the film as a sealer due to inadequate wear characteristics, abrasion resistance, and the like. Moreover, upon drying the film lost its ability to retain the aggregate under normal use conditions.

EXAMPLE II

The procedure as set forth in Example I was repeated with the exception that Koppers Pavement Sealer manufactured by Koppers Co. Inc. of Pittsburgh, Pennsylvania, was employed in the place of "X-10" pavement sealing composition. Those two coal tar emulsions are substantially similar compositions with the principal distinction being that Koppers Pavement Sealer includes about one percent of an ordinary; that is, coarse, acrylonitrile/butadiene latex having a medium acrylonitrile content. Pavement sealing films cast from the compositon had excellent properties similar to those films cast with the composition of Example I.

EXAMPLE III

The procedure as set forth in Example I was repeated with the exception that an equal volume of the pavement sealer known as Koppers Super Pavement Sealer was employed in the place of "X-10" pavement sealer.

Koppers Super Pavement Sealer is similar to the Koppers pavement sealer employed in Example II with the exception that the super pavement sealer includes about 3 percent by weight based upon tar of an acrylonitrile/butadiene copolymer having a medium acrylonitrile content. Here again, pavement sealing films cast from the composition had excellent properties smaller to those of the films cast with the composition of Example I. It was noted here that the composition of this Example will hold the sand in suspension almost indefinitely, whereas the compositions of Example I and Example II maintain the sand in suspension in an unmixed tank for about 4-10 hours and about 24-48 hours respectively. It may be noted here also that the length of time may be increased in those cases by employing a greater amount of the extraordinarily small particle size latex.

EXAMPLE IV

By way of comparison, the procedure as set forth in Example I was repeated with the exception that the acrylonitrile/butadiene latex known as "Pliopave L-360" latex manufactured by Goodyear Tire and Rubber Co. of Akron, Ohio, was employed in place of the Chemigum Latex 246. The Pliopave L-360 recommended for modifying tars by the manufacturer has a relatively coarse average particle size compared with latex useful according to this invention. It was noted that if the batch was left unagitated for even a short period of time, the sand settled out of the slurry, sometimes resulting in the loss of the entire batch of materials. The loss was primarily due to the fact that the agitator would bind in the sand mass and could not be restarted. It was noted that films cast from these compositions were not thixotropic in nature, did not maintain the sand in suspensions, and did not bond well to an asphalt pavement when compared with the compositions of the foregoing Examples I-III.

It may be further noted here that the thixotropicity of the compositions of the invention is surprising and unexpected in several respects. The compositions of the invention may employ generally a quantity of water up to several times that quantity which would ordinarily be expected in a pavement sealing composition. Moreover, the compositions may incorporate a large quantity of a coarse sand and maintain the sand in suspension whereby a film cast from the compositions has substantially uniform sand distribution and improved bonding properties. For example, the recommended quantity of sand for use in connection with known pavement sealing ranges from about 3-7 pounds of sand per gallon of pavement sealing compositions according to the invention ordinarily include from 12 to 18 pounds of sand per gallon of pavement sealing composition. This is so even though a much coarser sand is employed than would ordinarily be expected in conventional pavement sealing compositions.

The difference in the amount of sand results in a pavement sealing composition having unusually different properties when applied as a coating. Those compositions higher in sand content acutally have a greater ability to cover the surface of the existing asphalt pavement especially where the pavement is exceptionally coarse.

The coating may be spread over properly prepared and cleaned asphalt with a mechanical spreader or with a squeegee. The coating is preferably applied in two coats, the first coat being applied at least at the rate of 1/4 gallons per square yard. The second coat is also applied at the rate of at least 1/4 gallons per square yard.

EXAMPLE V

The procedure of Example I was repeated with the exception that in addition to the components listed, the silicone resin known as "Dri-Film 104" manufactured by the General Electric Co. was added to the previously prepared mixture in the amount of 1 gallon liquid. Dri-Film 104 is essentially a methylmethoxypolysiloxane resin and is commercially available. After thorough blending of the components, it was noted that the film cast from the composition retained the excellent characteristics of the composition of Example I, and in addition had an improved apparent water resistance and weather ability.

The foregoing has described the invention, the best presently known mode, and certain preferred embodiments thereof. It should be understood, however, that the invention is not necessarily limited to the specific embodiments disclosed therein, but may be variously practiced within the scope of the following claims.

1. A thixotropic composition for coating asphalt pavement and the like consisting essentially of water, conventional aqueous coal tar emulsion, copolymer latex and coarse sand, said copolymer being present from 2.5 to 15 percent by weight, of the tar content of said emulsion and having an average particle size between 400 and 1,000 Angstroms, said latex comprising an acrylonitrile/butadiene copolymer containing 30-49 parts acrylonitrile and 70-51 parts butadiene said coarse sand being present between 12 and 18 pounds per gallon of conventional coal tar emulsion, and the ratio of water to coal tar emulsion being about 1 to 1, whereby when the coating is spread over the pavement, it retains sufficient thixotropicity to prevent significant settling of the sand.

2. The composition as set forth in claim 1 wherein said composition further includes a silicone resin.

3. The composition as set forth in claim 1 wherein said copolymer is present in an amount from 8 to 12 percent by weight based upon tar in said coal tar emulsion.

4. The composition as set forth in claim 1 wherein said sand has a particle size such that substantially all sand passes through a U.S. Standard No. 20 mesh square screen and wherein only about 5 percent by weight of said sand passes through a U.S. Standard No. 30 mesh square screen.

* * * * *